INVENTORS
WILLIAM R. APBLETT, JR.
JOSEPH MARTIN
BY John Mauer, III
ATTORNEY

United States Patent Office 3,345,494
Patented Oct. 3, 1967

3,345,494
ROTATABLE ARC WELDING TORCH
William R. Apblett, Jr., Metuchen, and Joseph Martin, Menlo Park, N.J., assignors to Foster Wheeler Corporation, New York, N.Y., a corporation of New York
Filed Apr. 7, 1964, Ser. No. 357,943
12 Claims. (Cl. 219—125)

This invention relates to arc welding torches and particularly to rotatable arc welding torches.

Heretofore, automatic welding torches containing a filler wire which is automatically fed into the arc between the electrode and work piece have not been available. Automatic welding torches which are compact and easy to operate have been available, but these torches have not included automatic self-contained equipment within the torch for supplying filler wire into the arc zone. In welding a tube to a tube sheet, for example, added weld material is often required. In construction of vessels such as heat exchangers, requiring such tube to tube sheet welds, space is often limited and also a great convenience results in being able lo provide the permanent electrode for a welding arc and the filler material from one automatic welding torch which is compact and easy to operate. In repairing such heat exchangers, it is often essential that a compact automatic torch be available to make the repair as the accessible space is generally far too limited to permit cumbersome wire feeding equipment to be used in conjunction with a torch.

The present invention contemplates an automatic compact welding torch comprising an electrode mounted on a rotatable shaft. Motion is supplied to the rotatable shaft by means of an electric motor. A collector assembly is provided with a brush and a contact collector ring to supply electric power to the rotating electrode. The collector assembly has a channel associated with an annular groove to also introduce shielding gas to the rotating torch. A cup is provided around the electrode to retain the gas supply about the arc. A channel means is provided to convey the gas from the collector assembly to the cup. Likewise, a conductive means is provided to convey the welding current from the collector assembly to the electrode surrounded by the cup.

Located within the cup is a threaded spool of electrically insulating material. The spool is secured to the rotatable shaft so it will rotate with the shaft. A wire guide tube is secured to the lower portion of the spool so as to rotate with the spool. A ring is threaded to the body of the spool so as to move downward when prohibited from rotating when the spool rotates. Protrusions from the ring are held by grooves in the inner surface of the cup so that the washer may move along the longitudinal axis of the spool but cannot rotate free of the cup. Filler wire is wrapped around the spool with one end in the guide tube and the other end secured to the washer-like ring. As the torch rotates in operation, the cup is held fixed by a clamp mounted on the torch frame. The spool within the cup rotates while the ring or washer is held fixed from rotation causing the washer to move downward and force the filler wire through the guide tube into the arc zone.

Accordingly, it is an object of the present invention to provide an automatic welding torch for welding tubes to tube sheets, which torch is a relatively simple compact construction and easy to operate.

Another object of this invention is to provide an arc welding torch having a self-contained wire feeding device.

Still another object of this invention is to provide a wire-feeder which can be compactly incorporated within a rotatable arc welding torch.

Other objects and a fuller understanding of the invention may be had by referring to the following description and claims, taken in conjunction with accompanying drawings in which:

Figures 1, 2, 3:
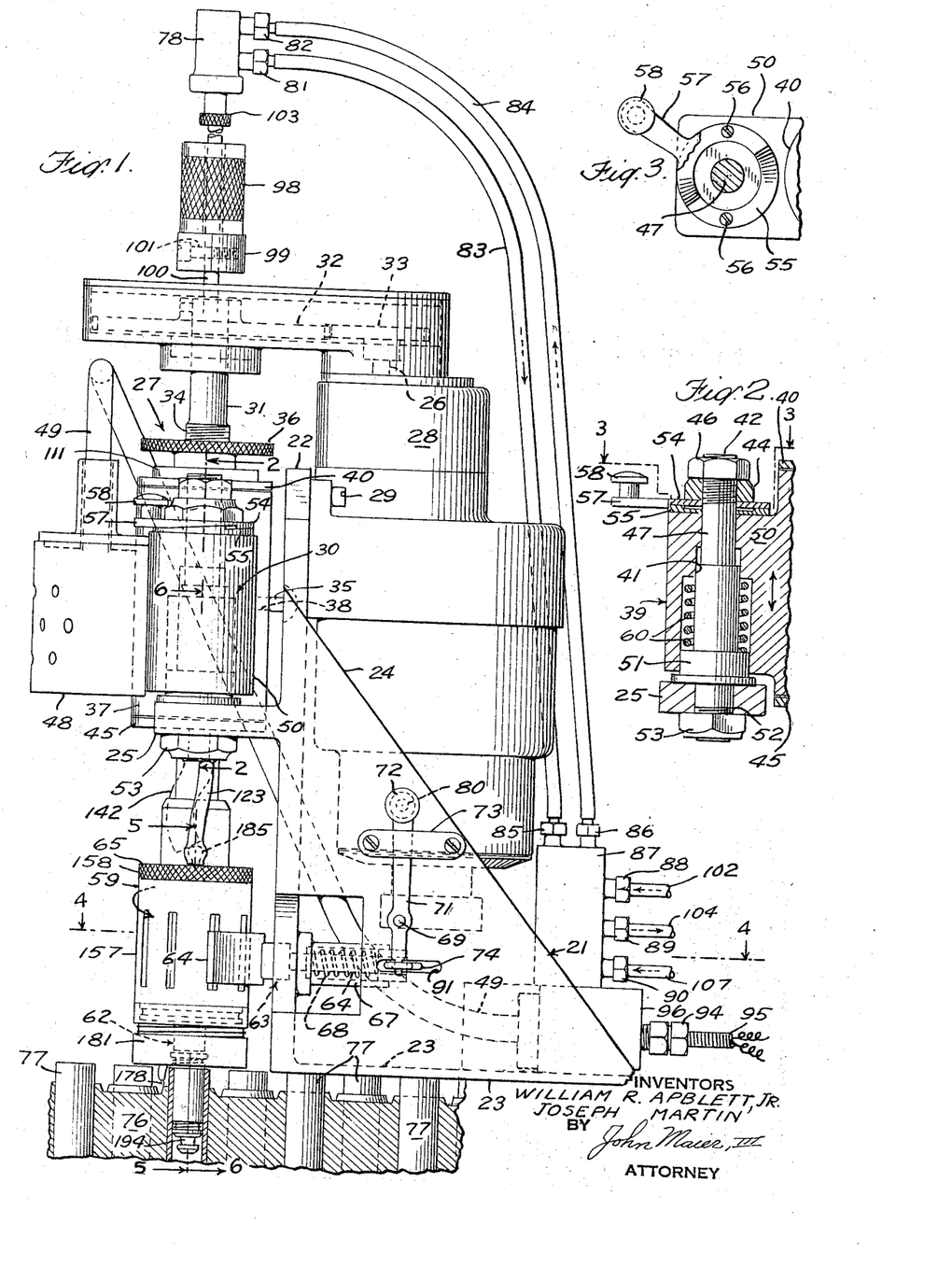
FIGURE 1 is a view in side elevation of the apparatus embodying the invention.
FIGURE 2 is a portion of the apparatus in vertical section taken on line 2—2 of FIG. 1.
FIGURE 3 is a planned section taken on line 3—3 of FIG. 2.

Referring now to the drawings and more particularly to FIG. 1, a frame 21 has a vertical section 22 located on a base portion 23 with two side bracing members 24. Located at right angles to the vertical section 22 is a horizontal bar 25 which supports a vertical assembly, generally designated by the numeral 27. The vertical assembly 27 is formed about a rotating shaft 31. Secured to the shaft 31 is a gear 32 which is driven by a pinion gear 33 secured to a shaft 26 of a motor 28. The motor 28 is secured to the vertical member 22 of the frame 21 by means of bolts 29. The shaft 31 below the gears 32 has a threaded portion 34. An adjustment knob 36 engages the threaded portion 34 of the shaft 31. Depending upon the direction of rotation in which an adjustment knob 36 is turned, the shaft 31 is either raised or lowered. The shaft 31 is rotatably held by a cylindrical housing 37 which is closed at the top by a plate 40 and at the bottom by a plate 45. The cylindrical housing 37 encloses the collector assembly 30, hereinafter referred to in greater detail. The top plate 40 and the bottom plate 45 rotate with the shaft 31 as does the adjustment knob 36. Attached to the cylindrical housing 37 is a brush box 48 into which an electrically insulated power cable 49 is directed. A gas supply hose 35 is connected to the cylindrical housing 37 at opening 38.

Connected to the cylindrical housing 37 is an adjustment mechanism 39, the details of which are best shown in FIG. 2. Following one complete rotation of the torch, the height is raised a predetermined amount by the adjustment mechanism 39 if a second welding pass is desired. A body 50 of the adjustment mechanism 39 is rigidly secured to the cylindrical housing 37. A rod 47 is vertically disposed through the body 50 in which there is a cylindrical channel 41. A guide ring 51 fits into a channel 41 and about the rod 47. The lower end of the rod 47 passes through the horizontal bar 25 of the frame 21 and then is secured by a nut 53 engaging the thread 52. A coil spring 60 is located about the rod 47 within the channel 41. The upper end of the rod 47 passes through an upper cam wafer 54 and a lower cam wafer 55 which are in sliding contact with one another on top of the body 50. A washer 44 is fitted above the upper cam wafer 54 and the upper end of the rod 47 is secured by a nut 46 engaging the thread 42. The lower cam wafer 55 is rigidly secured to the body 50 by means of two screws 56 as best seen in FIG. 3. A cam handle 57 is secured to the upper cam wafer 54. A knob 58 is located at the remote end of the handle 57 for convenience in operation. By movement of the handle 57, the upper and lower cam wafers interact to increase their combined thickness, forcing the washer 44 against the nut 46 threaded to the shaft 47. Since the horizontal bar 25 is rigid, the body 50 thereby moves downward. When movement of the handle 52 relieves the force upon the shaft 47, the force of the coil spring 60 within the cylinder 41 forces the body 50 upward away from the fixed horizontal bar 25.

The shaft 31 which is vertically disposed passes downward through the cylinder housing 37. A two-part cup assembly 59 is secured to the rotating shaft 31 by a cup adaptor 65 which rotates free of the shaft 31 as will be hereinafter explained. The cup assembly 59 is secured to the adaptor 65 to permit the shaft 31 to rotate while the two-part cup assembly 59 remains fixed.

Figure 4:
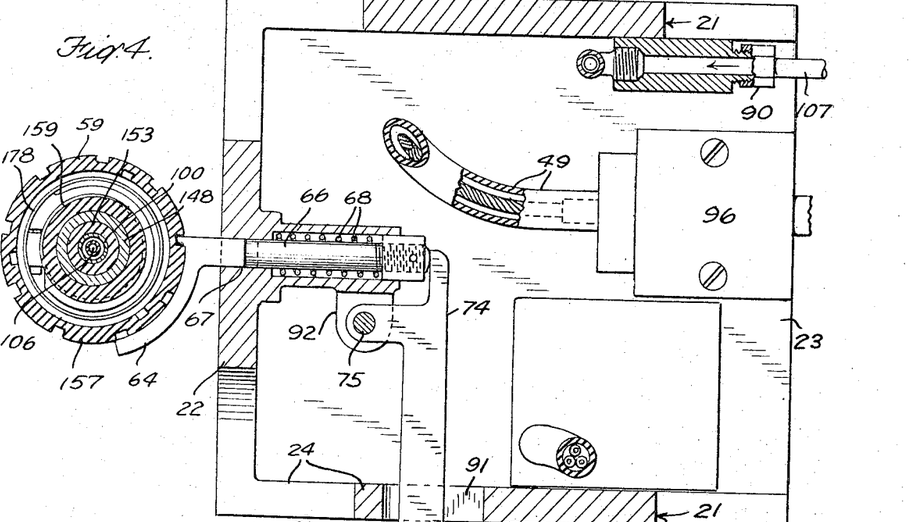
FIGURE 4 is a planned section taken on line 4—4 of FIG. 1 on an enlarged scale.
Figure 5:
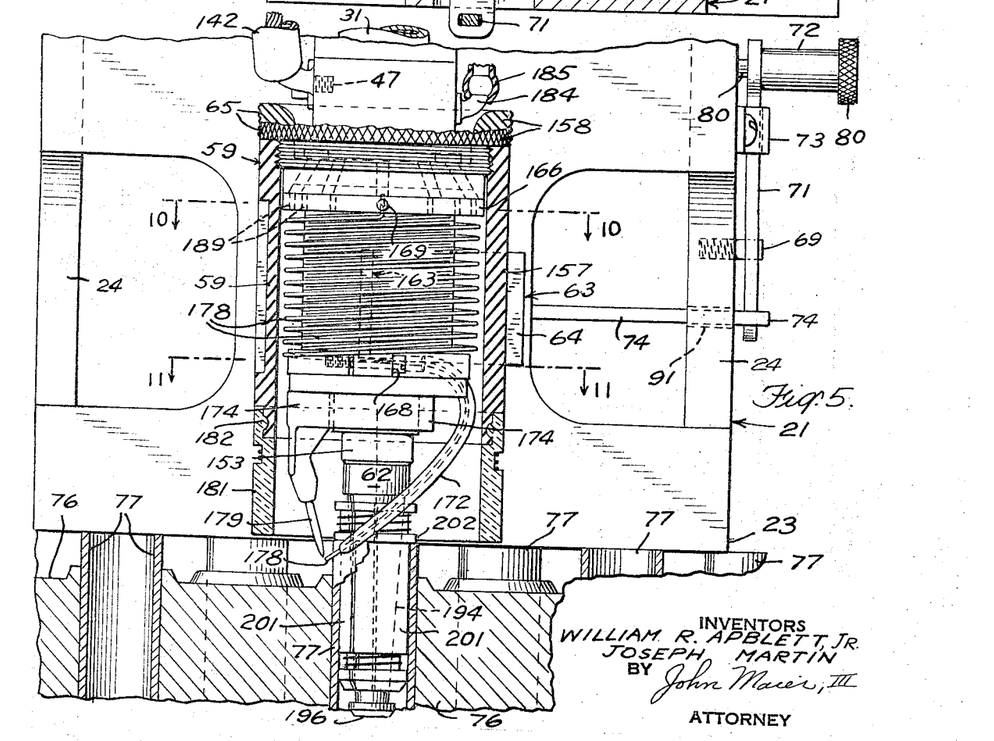
FIGURE 5 is a portion of the apparatus with parts in cross section taken on line 5—5 of FIG. 1 and on a larger scale.

Adjacent the cup assembly 59 is a clamping or locking assembly 63. As best shown in FIGS. 1, 4, and 5, a clamp 64 of the locking assembly 63 comes in frictional contact with the cup 59, thereby preventing rotation of the cup 59 during the rotation of the shaft 31. A rod 66 is connected to the clamp 64 and slidably fitted through a guide channel 67. A spring 68 forces the clamp 64 away from the cup assembly 59. An arm 74 is connected to the end of the rod 66 remote from the clamp 64. An extension 92, secured to the guide channel 67, supports a pin 75 about which the arm 74 pivots. An opening 91 permits the arm 74 to extend outside the side bracing member 24. At the other end of the arm 74, a handle 71 is located which pivots on a pin 69. A stop 73 limits the movement of the handle 71. A knob 72 which has a spring-loaded plunger 80 is located at the top end of the handle 71. Openings 79 are provided in the side bracket 24 to receive the plunger 80 thereby securing the handle 71 in place. Movement of the handle 71 moves the arm back and forth on the pin 75 which in turn moves the rod 66 backwards and forwards through the guide channel 67.

When in operation, the base 23 of the frame assembly 21 is placed over the ends of the vessel tubes 77 which project outward from the vessel tube sheets 76.

The shaft 31 has a center channel 93 (FIG. 8) through which is fitted a tube 100. By means of a bushing 103 (FIG. 9), the tube 100 is connected to an adaptor 78 to which two couplings 81, 82 are connected. Coupling 82 fastens a water-inlet hose 84 and coupling 81 fastens a water-outlet hose 83 to the adaptor 78. A supply unit 87 connects the outside utility supplies to the torch. The water supply 102 is connected to the supply block 87 by means of an outside coupling 88. The water-inlet hose 84 is connected to the supply unit 87 by an inside coupling 86. Water flows from the water inlet 102 through the water-inlet hose 84 into the adaptor 78. Coolant leaving the torch flows through the adaptor 78 into the water-outlet hose 82, which by means of an inside coupling 85 is also connected to the supply block 87 and flows outward to a water-drain line 104 which is connected to the supply block 87 by means of a coupling 89. Shielding gas is provided through the supply block 87 from a line 107 which is connected to the supply block 87 by means of an outside coupling 90. Electricity from a power source 95 is connected through a receptacle 96 by means of a coupling 94. The power cable 49 is connected to the receptacle 96 and supplies the necessary welding current into the brush box 48.

A hammer 98 (FIG. 1) is provided which slides from the adapter bushing 103 to a stop block 99 which is secured to the tube 100 by means of a clamp pin 101. The hammer 98 serves to force a pilot assembly 62 into a vessel tube 77 as will hereinafter be explained in greater detail.

Figure 9:
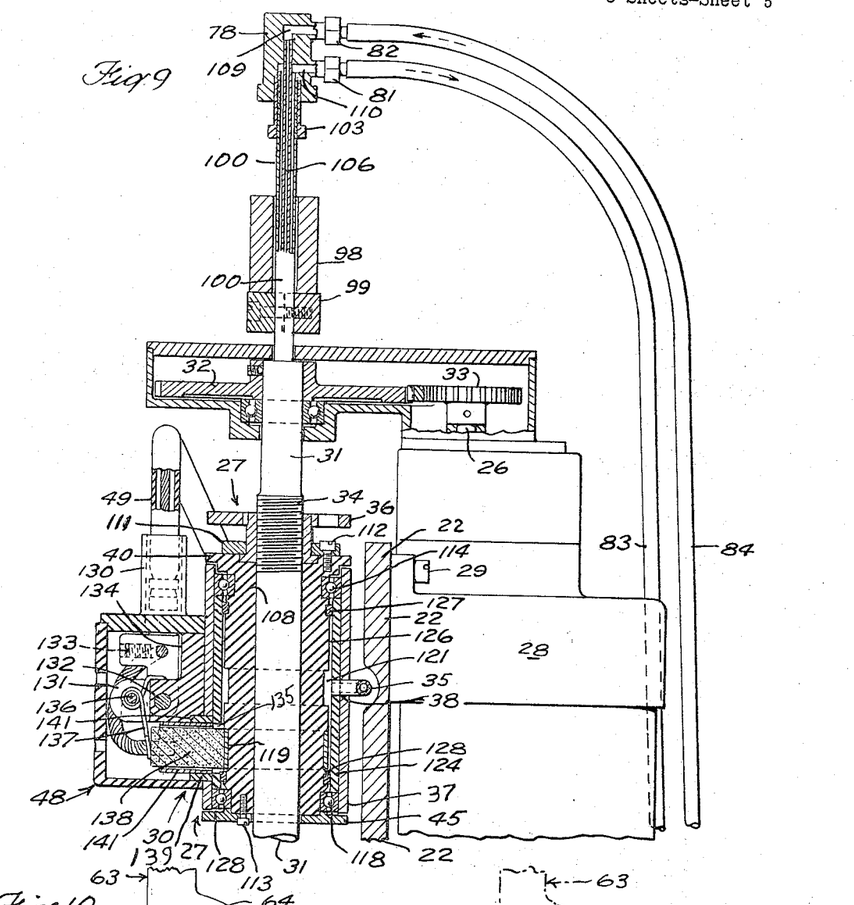
FIGURE 9 is a partial vertical section of the upper part of the apparatus shown in FIG. 1.

Referring now to FIG. 9, the tube 100 has approximately concentric within it a smaller water inlet tube 106. The water inlet tube 106 extends upward into the adapter 78. Water from the water inlet hose 84 passes through a channel 109 (FIG. 9) in the adapter 78. A channel 110 conveys water leaving the adapter 78 to the discharge hose 83. Since the water inlet tube 106 is beyond the channel 110, the cooling water can only pass downward through the water inlet tube 106 and then back upward in the space between the water inlet tube 106 and the outlet tube 100. In this manner inlet tube 106 and outlet tube 100 serve as a conduit means for cooling water.

Figure 8:
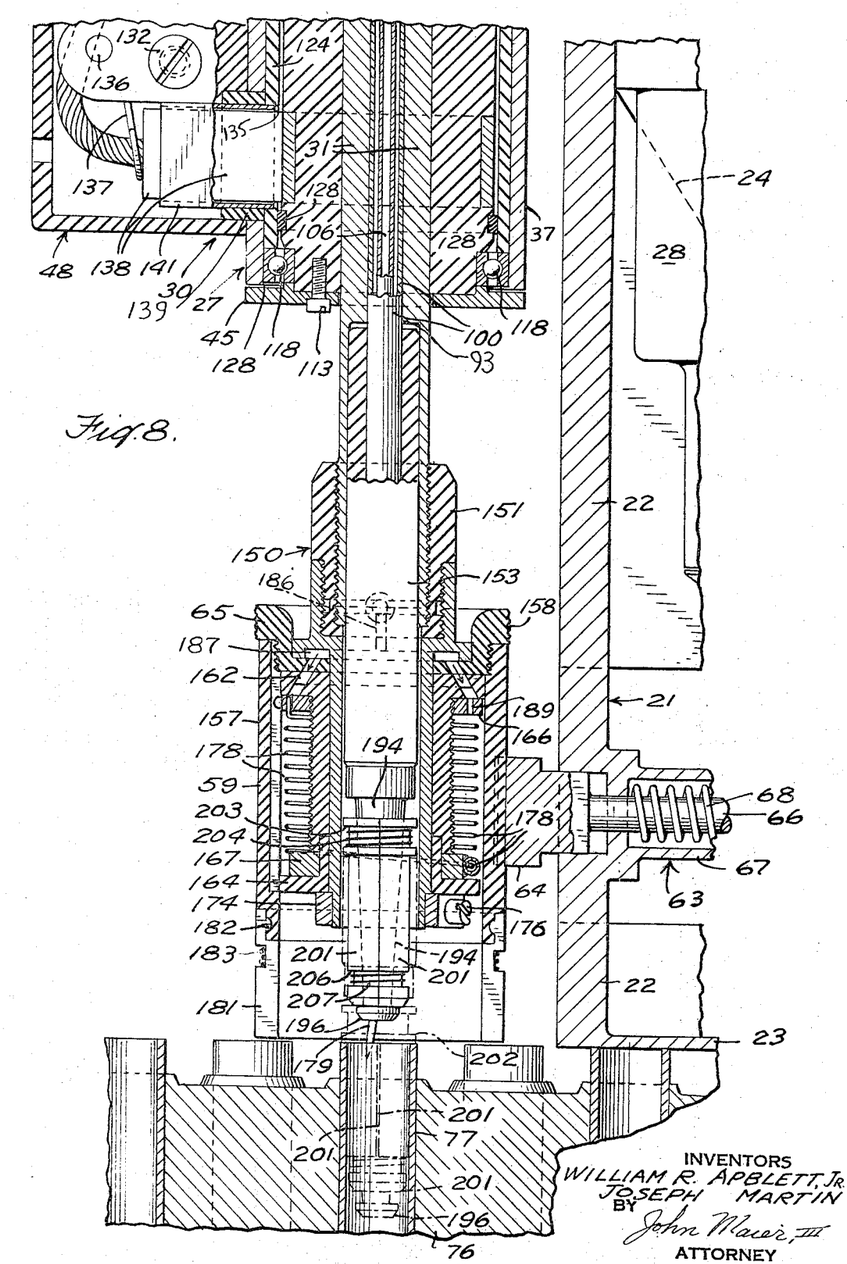
FIGURE 8 is a vertical section taken on line 8—8 of FIG. 6 with the pilot assembly of the apparatus in uppermost position.

Referring now in detail to the collector assembly 30, which is best shown in FIGS. 8 and 9, the shaft 31 passing through the assembly 30 is surrounded by a sleeve 108 of electrical insulation material. The height adjusting knob 36 is retained in contact with the electrically insulating sleeve 108 by means of a retaining ring 111. The retaining ring 111 is secured to the insulating sleeve 108 through the top cover 40 of the collector assembly 30 by means of bolts 112. Similarly, the lower plate 45 is secured to the insulating sleeve 108 by means of bolts 113. The insulating sleeve 108 is rotatably mounted on an upper ball-bearing race 114 and a lower ball-bearing race 118. Circumferentially located about the lower end of the insulating sleeve 108 is a metal collector ring 119. Upwards from the metal collector ring 119 is an annular groove 121 located in the insulating sleeve 108. The groove 121 works in association with the gas inlet 38 and with a channel 122. The groove 121 and channel 122 form in the insulating sleeve 108 a collector for supplying shielding gas to a rotating torch from a fixed inlet 38. A gas inlet hose 35 is connected from the supply block 87 to the inlet 38. The gas flows the necessary distance about the annular groove 121 depending upon the position of rotation of the insulating sleeve 108 and shaft 31 and conveys the shielding gas to the cup assembly 59. A gas outlet 117 is connected to the conduit 122. A tube 123 is coupled to the outlet 117 by the joint 120.

The cylindrical housing 37 serves as a cover for the collector assembly 30 and is lined with an electrical insulating lining 124. There is a space 126 located between the insulating sleeve 108 and the insulating lining 124. When the shaft 31 is rotated by the motor 28, the height adjusting knob 36, the plate 110, the top cover 40 and lower cover 45, along with the insulating sleeve 108, and metal collector ring 119 rotates with the shaft 31. The insulating lining 124 as well as the cylindrical housing 37 remains fixed during rotation of the shaft 31. An upper seal 127 and a lower seal 128 are provided to prevent the escape of shielding gas from the collector assembly 30.

As best shown in FIGS. 8 and 9, a brush box 48 which preferably made of an electrically insulating material is attached to the cylindrical housing 37 of the collector assembly 30. The power cable 49 passes into the brush enclosure 48 through a cable guide channel 130. The conductive core of cable 49 is secured to a metallic electrically conductive lug 131 by means of a set screw 133. A bolt 132 secures the lug 131 to an inner insulating support 134 which is rigidly supported by the brush enclosure 48 and is secured to the cylindrical housing 37. A pin 136 is rigidly mounted in the lug 131 to hold a wire clip spring 137 in place. The electrical cable 49 is connected to a metallic brush 138 which is placed into a brush outlet 135, so as to be in sliding contact with the metal collector ring 119. The spring 137 forces the brush block 138 against the metal collector ring 119 to assure continuous electrical contact between the fixed block 138 and the rotating collector ring 119. An insulation member 141 which surrounds a brush guide block 139 prevents electrical contact between the brush block 138 and cylindrical housing 37.

Figures 6, 7:
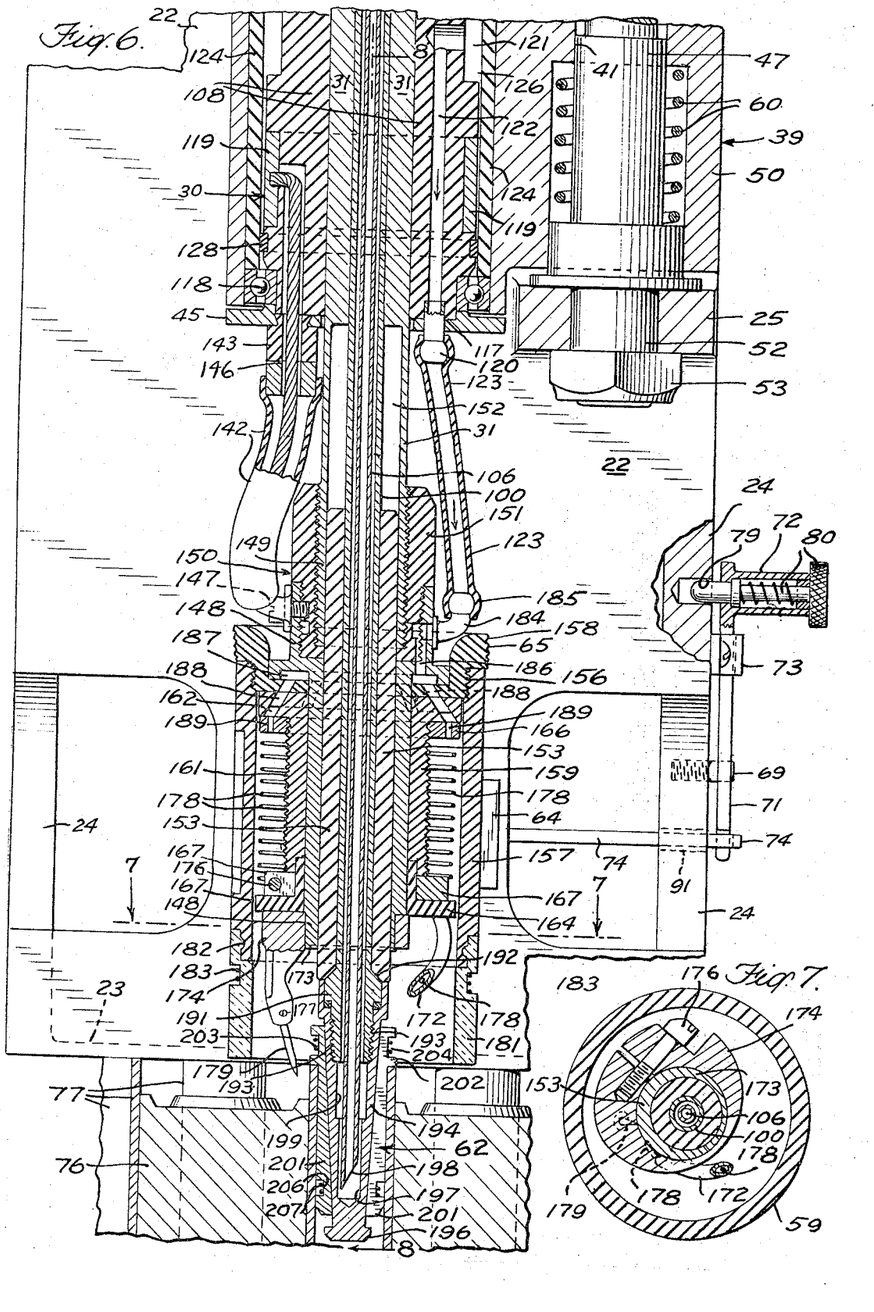
FIGURE 6 is a portion of the apparatus taken on line 6—6 of FIG. 1 and on a larger scale.
FIGURE 7 is a planned section taken on a line 7—7 of FIG. 6.

Referring now to FIG. 6, a power cable extension 142 is connected to the metal collector ring 119. The conductive core of an insulated cable extension 142 feeds through a channel 146 formed in the insulating sleeve 108. A sleeve 143 of insulating material is provided to prevent contact between the core of cable 142 and the lower cover 45 of the collector assembly 30. The other end of the core of cable 142 is secured by a bolt 147 to a conductor sleeve 148. At the point where the shaft 31 is secured to the cup assembly 61, a thread 149 is formed at the end of the shaft 31. An insulating sleeve 151 is threaded on the shaft 31 so as to completely enclose the thread portion 149 of the shaft 31. This prevents the passage of electrical current upward through the shaft 31. The conductor sleeve 148 is screwed on to the lower end of the insulating sleeve 151. The shaft 31 has a channel 152 formed therein at the lower portion of the collector assembly 30. The assembled combination of the shaft 31, the insulation sleeve 151, and the conductor sleeve 148, form an elongated assembly 150. The channel 152 continues into the lower portion of the elongated assembly 150. An insulation sleeve 153 which is part of the pilot assembly is in sliding relationship with the channel 152. The insulation sleeve 153 encompasses the lower portion of the tube 100. The conductor sleeve 148 is concentrically located about the insulating sleeve 153 and is in sliding contact therewith. The cup adapter 65 preferably made of an electrically insulating material rotates about the conductive sleeve 148. Threads 156 are provided on the adapter 65 to secure the the cup assembly 59 to the adapter 65. A knurled surface 158 is provided for ready rotation of the adapter 65 by hand.

The two-part cup assembly 59 has an upper cup 157 and a lower cup 181. About the arc zone the lower cup 181, preferably made of glass or other translucent material, is secured to the bottom of the upper cup 157. The connection between the upper cup 157 and the lower cup 181 is made by means of the groove 182 along the with the force of the springs 183.

Figure 10:
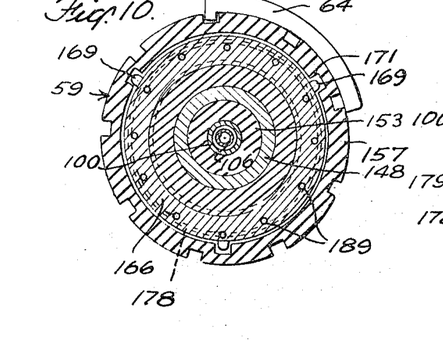
FIGURE 10 is a planned section taken on line 10—10 of FIG. 5.
Figure 11:
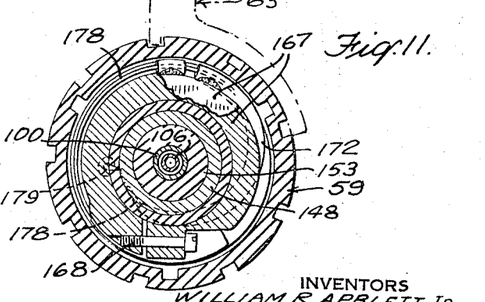
FIGURE 11 is a planned section taken on line 11—11 of FIG. 5.

A spool 159 which serves as a wire storage member is in sliding contact with the adapter 65. Spool 159, however, is also secured to the electrical conductor sleeve 148 by means of a key and key way 163 (FIG. 5). The spool 159, which may also be termed an electrically isolated cylindrical member, has a threaded surface 161 and an upper lip 162. A fixed ring 167 is secured against the flange portion of a lower lip 164 by means of a bolt 168. An upper ring 166 is internally threaded to the surface 161 of the spool 159. Rotation of the spool moves the upper ring 166 down. As best shown in FIG. 10, the ring 166 has ridges or protrusions 169 on its outer periphery. Grooves 171 in the upper cup 157 are designed to prevent rotation of the ring 166 when the upper cup 157 is held in a fixed position by the clamp 64. The longitudinal grooves 171, however, do not prevent the downward movement of the upper ring 166.

A guide tube 172 is secured to the fixed ring 167. The conductor sleeve 148 projects beneath the lower lip 164 of the spool 159. The end 173 of the conductive sleeve 148 is eccentrically turned. An electrode holder 174 is secured by means of a bolt 176 to the eccentric end portion 173. An electrode 179 is held in the electrode holder 174 by means of a bolt 177. A filler wire 178, such as suitable for use with a tungsten inert-gas welding operation, is wrapped in spool fashion about the spool 159. One end of the filler wire 178 is secured to the threaded ring 166. The other end of the filler wire 178 is passed through the arcuately-shaped guide tube 172 which directs the filler wire into the arc zone. When the clamp 64 holds the cup assembly 59 securely to prevent rotation, the shaft 31 rotates freely of them.

While the shaft 31 rotates thereby rotating the spool 159, the ring 166 is prevented from rotating by means of the upper cup 157. Therefore, as the shaft rotates, the ring 166 moves downward in accordance with the pitch of the thread 161, forcing the filler wire 178 out through the guide tube 172 and into the arc zone adjacent the electrode 179. It is therefore apparent that upon rotation of the electrode 179, the filler wire 178 is automatically fed into the arc.

A gas inlet 184 is connected to the conductor sleeve 148. Tube 123 is connected to the gas inlet 184 at joint 185. A channel 186 which conveys the gas to an annular conduit 187 is drilled through the body of the conductor sleeve 148. Gas flows downward into the cup from the annular conduit 187 by means of a series of holes 188. Likewise, apertures 189 are provided in the ring 166 to permit flow of the gas past the ring 166 to the arc zone.

The lower end of the tube 100 has an enlarged portion 191. The enlarged portion 191 of the tube 100 has sloping sides 192 and a threaded end portion 193. The insulating sleeve 153 is formed so as to contact tube 100 at surface 192. The enlarged portion 191 has a threaded end 193. Threaded to the end 193 is a pilot guide 194. The narrow end of the frusto-conical pilot guide 194 is sealed with a buffer tip 196. The threaded end 193 of the frusto-conical guide 194 is open to permit access to a hollow channel 197 within the guide 194. The tube 106 extends beyond the end 191 of the tube 100 nearly to the end of the channel 197. The tube 106 has a slanted end 198 so as to bring cooling water as near to the end of the frusto-conical guide 194 as is possible and still permit space for the water to flow upward around the outside of the tube 106 and within the tube 100 which remains fixed as the shaft 31 rotates. The channel 197 has an enlarged section 199 which serves to provide extra cooling water near the arc zone. Surrounding the frusto-conical guide 194 and formed so as to be in sliding contact therewith are four pilot segments 201. A lip 202 is formed on the pilot segments 201 to prevent the pilot assembly 62 from entering too far into the vessel tube 77, which is being welded to the tube sheet 76. Above the lip 202 on the segments 201 is an annular groove 203. Springs 204 in circular form are placed around the segments 201 to hold them against the frusto-conical guide 194. Similarly, a lower annular groove 206 is provided with similar springs 207. The pilot assembly 62 which is in sliding relationship with the elongated assembly 150 can be moved upward until the insulating sleeve 153 contacts the upward end of the channel 152.

In operation the base 23 of the frame 21 is placed on the upper end of the vessel tubes 77 within the tube sheet 76. The pilot assembly 62 is inserted into the open end of the vessel tube 77. The hammer 98 is lifted upward and forced downward against the stop 99 thereby forcing the tube 100 downward and therefore the frusto-conical guide downward to cause expansion of the segments thereby forcing them against the interior walls of the tube 77. The gas and water supplies are turned on. The handle 71 is moved forward to force the clamp 64 against the cup 157, thereby prohibiting any rotation of the cup 157. Simultaneous with the striking of an arc from the electrode 179, the motor 28 is energized thereby causing rotation of the shaft 31 along with the spool 159. The ring 166 which is prevented from rotation by the cup 157 moves downward due to the operation of the thread of the rotating spool 159. The filler wire 178 is forced through the guide tube 172 into the arc zone automatically. At the completion of the weld the power to the electrode 179 is stopped and the motor de-energized. Immediately upon the discontinuation of the rotation of the electrode 179, the wire feed automatically stops. Prior to operation of the torch and during the insertion of the pilot guide assembly 62 into the tube 77, the height of the torch is adjusted by means of the adjuster knob 36. Once this is adjusted, the torch is positioned for one welding pass. If a second welding pass is desired, the torch is raised before a second welding pass by means of the fixed adjuster assembly 39.

In the event that the spacing of the electrode 179 needs to be changed so as to fit a particular vessel tube diameter, the bolt 176 is loosened and the electrode holder 174 is moved about the eccentric end portion 173 until the proper position is reached.

It is to be understood that the above-described arrange-

What is claimed is:

1. A welding torch comprising:
   an elongated assembly means;
   means for supporting said elongated assembly means for rotation about its longitudinal axis;
   an electrode means mounted on said elongated assembly means adjacent one end of said elongated assembly means, said electrode means having a tip for striking an arc to a workpiece;
   a guide means for directing a filler wire into the location of the arc between the tip of the electrode and the workpiece, the filler wire being coiled about the elongated assembly means directly above said guide means;
   means for rotating the elongated assembly about its longitudinal axis;
   means for utilizing the rotation of said elongated assembly means for feeding the filler wire through the guide means; and
   means for supplying electrical power to said electrode.

2. A welding torch according to claim 1 further comprising:
   means for covering the arc between said electrode tip and said workpiece with a shielding gas, said means for covering the arc including a gas cup means which surrounds the filler wire coiled about the elongated assembly means.

3. A welding torch comprising:
   an elongated assembly means;
   means for supporting said elongated assembly means for rotation about its longitudinal axis;
   an electrode means mounted on said elongated assembly means laterally of the longitudinal axis of said elongated assembly means adjacent one end of said elongated assembly means, said electrode means having a tip for striking an arc to a workpiece;
   a guide means for directing a filler wire into the location of the arc between the tip of the electrode and the workpiece, said guide means being mounted on said elongated assembly means adjacent said electrode means;
   a spool means rigidly mounted on said elongated assembly means above and adjacent said guide means, said spool means having a threaded outer surface;
   a ring means having a threaded inner surface engaging the threaded outer surface of said spool, the filler wire being coiled about said spool means with one end connected to said ring means and with the other end within said guide means;
   means for rotating said elongated assembly means about its longitudinal axis;
   means for preventing the rotation of said ring means during the rotation of said elongated assembly means to move said ring means downward along the thread on said spool means thereby forcing the filler wire through said guide means; and
   means for supplying electrical power to said electrode means.

4. A welding torch according to claim 3 further comprising:
   means for covering the arc between said electrode tip and said workpiece with a shielding gas, said means for covering the arc including a gas cup means which surrounds the filler wire coiled about the elongated assembly means.

5. A welding torch for welding a tubular workpiece to a plate workpiece while supplying filler wire to the weld, comprising:
   a housing;
   a shaft assembly means supported by said housing, said shaft assembly means including an electrically conductive sleeve means extending at one end of said shaft assembly means and being electrically isolated, said electrically conductive sleeve means having an inside end and an outside end;
   drive means mounted on said housing and including an electric rotational drive motor for rotating said shaft assembly means about its longitudinal axis;
   an electrode holder rigidly mounted on the outside end of said electrically conductive sleeve means;
   an electrode supported by said electrode holder laterally of the longitudinal axis of the shaft assembly means, said electrode having a tip for arcing in a circumferential path as the shaft assembly means is rotated to form a weld between a tube workpiece and a plate workpiece;
   a filler wire guide means including an arcuately-shaped conduit electrically isolated from but rigidly mounted on the lower end of said electrically conductive sleeve adjacent said electrode holder;
   means for supplying electrical power to said electrode through said electrically conductive sleeve;
   a wire storage member rigidly mounted about said electrically conductive sleeve means adjacent and above said electrode holder, said wire storage member being a cylinder of electrical insulating material and with a threaded outer surface;
   a ring means having a threaded inner surface engaging the threaded outer surface of said electrically isolated cylindrical member, said ring means including at least one protrusion which extends radially therefrom, the filler wire being coiled about said wire storage member with one end connected to said ring means and with the other end within said guide means;
   a cup assembly means rotatably mounted about the inside end of said electrically conductive sleeve means and including a cylindrical portion which surrounds the coiled filler wire, said cylindrical portion of said cup assembly means having at least one longitudinal groove on its inner surface, said protrusion on said ring means extending into said longitudinal groove to prevent rotation of said ring means while permitting longitudinal movement of said ring means;
   a clamping assembly means adapted to engage said cup assembly means to prevent rotation of said cup assembly means during the rotation of said shaft assembly means thereby preventing the rotation of said ring means which is screwed outwardly toward the filler wire guide means by the rotation of said shaft assembly means forcing the filler wire through said filler wire guide means; and
   means for conveying a shielding gas into said cup assembly means.

6. A welding torch according to claim 5 further comprising:
   a pilot guide means rotatably mounted at the outside end of said shaft assembly means adapted to engage with the tubular workpiece thereby retaining the path of the electrode concentric with the tubular workpiece.

7. A welding torch according to claim 6 further comprising:
   conduit means extending longitudinally through said shaft assembly means to convey a cooling medium to said pilot guide means.

8. A welding torch for welding a tubular workpiece to a plate workpiece while supplying filler wire to the weld, comprising:
   a housing;
   a shaft assembly means supported in a substantially vertical position by said housing, said shaft assembly means having a conduit extending substantially concentrically along its longitudinal length;

an outlet tube located within said conduit in a sliding relationship with said shaft assembly, said outlet tube having a pilot guide means at its lower end adapted to engage a workpiece tube;

an inlet tube located within said outlet tube and extending adjacent to said pilot guide means, said inlet tube supplying cooling fluid to said pilot guide means, the cooling fluid being discharged through the annular space formed between said inlet tube and said outlet tube;

drive means mounted on said housing and including an electric rotational drive motor for rotating said shaft assembly means about its longitudinal axis;

an electrically conductive sleeve means rigidly mounted about said shaft assembly means at the lower portion of said shaft assembly means, the lower portion of said shaft assembly means being electrically isolated;

an electrode holder rigidly mounted adjacent the lower end of said electrically conductive sleeve means;

an electrode supported by said electrode holder laterally of the longitudinal axis of the shaft assembly means, said electrode having a tip for arcing in a circumferential path as the shaft assembly means is rotated to form a weld between the tube workpiece and plate workpiece;

a filler wire guide means including an arcuately-shaped conduit electrically isolated from but rigidly mounted on said electrically conductive sleeve means adjacent said electrode holder;

means for supplying electrical power to said electrode through said electrically conductive sleeve means;

an electrically isolated cylindrical member rigidly mounted about said electrically conductive sleeve adjacent and above said electrode holder, said electrically isolated cylindrical member having a threaded outer surface;

a ring means having a threaded inner surface engaging the threaded outer surface of said electrically isolated cylindrical member, said ring means including at least one protrusion which extends radially therefrom, the filler wire being coiled about said electrically isolated cylindrical member with one end connected to said ring means and with the other end within said guide means;

a cup assembly means rotatably mounted about the upper end of said electrically conductive sleeve means and including a cylindrical portion which surrounds the filler wire coiled about said electrically isolated cylindrical member, said cylindrical portion of said cup assembly means having at least one longitudinal groove on its inner surface, said protrusion on said ring means extending into said longitudinal groove to prevent rotation of said ring means independently of said cup assembly means while permitting longitudinal movement of said ring means;

a clamping assembly means adapted to engage said cup assembly means to prevent rotation of said cup assembly means during the rotation of said shaft thereby preventing the rotation of said ring means which is screwed downward toward said filler wire guide means by the rotation of said shaft assembly means forcing the filler wire through said filler wire guide means; and means for supplying a shielding gas into said cup assembly means.

9. A welding torch for welding a tubular workpiece to a plate workpiece while supplying filler wire to the weld, comprising:

a housing;

a shaft assembly means supported by said housing, said shaft assembly means including an electrically conductive sleeve means extending at one end of said shaft assembly means and being electrically isolated, said electrically conductive sleeve means having an inside end and an outside end;

a collector assembly means located on said shaft assembly means and within a portion of said housing, said collector assembly means including an insulated generally cylindrical member rigidly secured to said shaft assembly means, said insulated generally cylindrical member having a circumferential groove adjacent a fixed shielding gas inlet in said housing and a longitudinal gas conduit in communication with the circumferential groove, said collector assembly further including a conductive ring rigidly mounted circumferentially about said insulated generally cylindrical member and a conductive brush mounted in said housing but electrically insulated therefrom, said conductive brush being in sliding engagement with said conductive ring and being connected to a source of electric power;

drive means mounted on said housing and including an electric rotational drive motor for rotating said shaft assembly means about its longitudinal axis;

an electrode holder rigidly mounted adjacent the outside end of said electrically conductive sleeve means;

an electrode supported by said electrode holder laterally of the longitudinal axis of the shaft assembly, said electrode having a tip for arcing in a circumferential path as the shaft is rotated to form a weld between a tubular workpiece and a plate workpiece;

a filler wire guide means including an arcuately-shaped conduit electrically isolated from but rigidly mounted on the lower end of said electrically conductive sleeve adjacent said electrode holder;

means for supplying electrical power to said electrode through said electrically conductive sleeve from said collector assembly;

a wire storage member rigidly mounted about said electrically conductive sleeve adjacent and above said electrode holder, said wire storage member being a cylinder of electrical insulating material with a threaded outer surface;

a ring means having a threaded inner surface engaging the threaded outer surface of said wire storage member with one end of the filler wire connected to said ring means and with the end of the filler wire within said guide means, said ring means having at least one protrusion extending radially outwardly from it;

a cup assembly means rotatably mounted about the inside end of said electrically conductive sleeve means and including a cylindrical portion which surrounds the coiled filler wire, said cylindrical portion of said cup assembly means having at least one longitudinal groove on its inner surface, said portrusion on said ring means extending into said longitudinal groove to prevent rotation of said ring means while permiting longitudinal movement of said ring means;

a clamping assembly means adapted to engage the outer surface of said cup assembly means to prevent rotation of said cup assembly means during the rotation of said shaft thereby preventing the rotation of said ring means which is screwed outwardly toward said filler wire guide means by the rotation of said shaft assembly means forcing said filler wire through said filler wire guide means; and means for supplying a shielding gas into said cup assembly means from said collector assembly means.

10. A welding torch according to claim 9 further comprising:

a pilot guide means rotatably mounted at the outside end of said shaft assembly means adapted to engage with the tubular workpiece thereby retaining the path of the electrode concentric with the tubular workpiece.

11. A welding torch according to claim 10 further comprising:

means extending longitudinally through said shaft assembly means to convey a cooling medium to said pilot guide means.

12. A welding torch for welding a tubular workpiece to a plate workpiece while supplying filler wire to the weld, comprising:
  a housing;
  a shaft assembly means supported in a substantially vertical position by said housing, said shaft assembly means having a concentrically located conduit extending along its longitudinal length;
  a collector assembly means located on said shaft assembly means and within a portion of said housing, said collector assembly means including an insulated generally cylindrical member rigidly secured to said shaft assembly means, said insulated generally cylindrical member having a circumferential groove adjacent a fixed shielding gas inlet in said housing and a longitudinal gas conduit in communication with the circumferental groove, said collector assembly further including a conductive ring rigidly mounted circumferentially about said insulated generally cylindrical member and a conductive brush mounted in said housing but electrically insulated therefrom, said conductive brush being in sliding engagement with said conductive ring and being connected to a source of electric power;
  an outlet tube located within said concentrically located conduit in a sliding relationship with said shaft assembly means, said outlet tube having a pilot guide means at its lower end to engage a tubular workpiece to be welded to a plate workpiece, said pilot guide sealing the lower end of said outlet tube;
  an inlet tube located within said outlet tube and extending adjacent to the lower end of said outlet tube, said inlet tube having a smaller outer diameter than the inner diameter of said outlet tube to form an annular space therebetween, said inlet tube supplying a cooling fluid to said pilot guide and said annular space discharging said cooling fluid;
  drive means mounted on said housing and including an electric rotational drive motor for rotating said shaft assembly means about its longitudinal axis;
  an electrically conductive sleeve rigidly mounted about said shaft assembly means at the lower portion of said shaft assembly means near to said pilot guide, the lower portion of said shaft assembly means being electrically isolated;
  an electrode holder rigidly mounted adjacent the lower end of said electrically conductive sleeve;
  an electrode supported by said electrode holder laterally of the longitudinal axis of the shaft assembly, said electrode having a tip for arcing in a circumferential path as the shaft is rotated to weld between the tube workpiece and plate workpiece;
  a filler wire guide means including an arcuately-shaped conduit electrically isolated from but rigidly mounted on the lower end of said electrically conductive sleeve adjacent said electrode holder;
  means for supplying electrical power from said conductive ring within said collector assembly to said electrode through said electrically conductive sleeve;
  an electrically isolated cylindrical member rigidly mounted about said electrically conductive sleeve adjacent and above said electrode holder, said electrically isolated cylindrical member having a threaded outer surface;
  a ring means having a threaded inner surface engaging the threaded outer surface of said electrically isolated cylindrical member, the filler wire being coiled about said electrically isolated cylindrical member with one end connected to said ring means and with the other end within said guide means;
  a cup assembly means rotatably mounted about the upper end of said electrically conductive sleeve and including a cylindrical portion which surrounds the filler wire coiled about said electrically isolated cylindrical member, said cylindrical portion of said cup assembly means having at least one longitudinal groove on its inner surface, said ridge on said ring means extending into said longitudinal groove to prevent rotation of said ring means independently of said cup assembly means while permitting longitudinal movement of said ring means;
  a clamping assembly means adapted to engage the outer surface of said cup assembly means to prevent rotation of said cup assembly means during the rotation of said shaft thereby preventing the rotation of said ring means which is screwed downward toward said filler wire guide means by the rotation of said electrically isolated cylindrical member forcing said filler wire through said filler wire guide means; and
  means for conveying the shielding gas from said collector assembly to within said cup assembly means.

References Cited

UNITED STATES PATENTS

| | | | |
|---|---|---|---|
| 1,949,251 | 2/1934 | Gilbert | 219—125 |
| 2,930,883 | 3/1960 | Adamec et al. | 219—125 |
| 3,035,157 | 5/1962 | Armstrong et al. | 219—125 |
| 3,207,408 | 9/1965 | Thome et al. | 219—125 X |
| 3,209,120 | 9/1965 | Glatthorn | 219—125 |
| 3,299,245 | 1/1967 | Tinnes. | |

RICHARD M. WOOD, *Primary Examiner.*

J. V. TRUHE, *Examiner.*